United States Patent [19]
Delloye et al.

[11] Patent Number: 5,641,408
[45] Date of Patent: Jun. 24, 1997

[54] INSOLUBILIZATION OF CONTAMINATING METALLIC IMPURITIES FROM LIQUID MEDIA COMPRISED THEREOF

[75] Inventors: Thierry Delloye, Perigny, France; Antoine Dissaux, Houston, Tex.

[73] Assignee: Rhone-Poulenc Chimie, Courbevoie Cedex, France

[21] Appl. No.: 521,224

[22] Filed: Aug. 30, 1995

[30]   Foreign Application Priority Data

Sep. 2, 1994 [FR] France .................................... 94 10544

[51] Int. Cl.$^6$ ................................................. C02F 1/52
[52] U.S. Cl. .................... 210/717; 210/724; 210/726
[58] Field of Search ...................... 210/724, 726, 210/727, 912, 717

[56]   References Cited

U.S. PATENT DOCUMENTS

| | | | |
|---|---|---|---|
| 913,034 | 2/1909 | McMurtrie | 210/726 |
| 1,930,885 | 2/1933 | Rittler | 210/717 |
| 1,940,409 | 12/1933 | Fink | 210/717 |
| 2,234,786 | 3/1941 | Walsh et al. | 210/724 |
| 2,854,315 | 9/1958 | Atler et al. | 210/717 |
| 2,952,641 | 9/1960 | McKenzie | 210/717 |
| 3,234,124 | 2/1966 | Irani | 210/912 |
| 3,764,553 | 10/1973 | Kirby | 210/724 |
| 4,071,449 | 1/1978 | Inoue et al. | 210/723 |
| 4,072,605 | 2/1978 | Thelander | 210/912 |
| 4,671,882 | 6/1987 | Douglas et al. | 210/721 |
| 4,737,356 | 4/1988 | O'Hara et al. | 210/912 |
| 4,804,498 | 2/1989 | Mizuno et al. | 210/712 |
| 5,098,579 | 3/1992 | Leigh et al. | 210/912 |
| 5,202,033 | 4/1993 | Stanforth et al. | 210/912 |

FOREIGN PATENT DOCUMENTS

| | | |
|---|---|---|
| 05027090 | 2/1993 | Japan . |
| 2254605A | 10/1992 | United Kingdom . |

OTHER PUBLICATIONS

Derwent Publications Ltd., London, GB; AN 87–082442 & JP–A–62 032 399 (MITSUBISHI HEAVY INDUSTRIES K.K.) 12 Feb. 1987.

*Primary Examiner*—Cynthia L. Nessler
*Attorney, Agent, or Firm*—Burns, Doane, Swecker & Mathis, L.L.P.

[57]   ABSTRACT

Impure liquid media containing contaminating amounts of metallic impurities, e.g., alkaline earth metals, heavy metals and/or radioactive elements, for example industrial effluents from the nitric acidulation of rare earth concentrates, are purified by separately introducing a source of phosphorus and a source of barium into the impure medium, whereby precipitating a solid residue which comprises a barium phosphate having such contaminating metallic impurities distributed therein, and thence separating the solid residue from the liquid medium thus purified.

12 Claims, No Drawings

INSOLUBILIZATION OF CONTAMINATING METALLIC IMPURITIES FROM LIQUID MEDIA COMPRISED THEREOF

BACKGROUND OF THE INVENTION

1. Technical Field of the Invention

The present invention relates to the treatment of liquid media to insolubilize contaminating metallic impurities contained therein, and thus producing a nonleachable residue therefrom.

2. Description of the Prior Art

Industrial plants produce liquid effluents containing a large number of impurities, in particular metallic impurities which may be polluting, dangerous, and toxic for the environment. This is the case, for example, at nuclear power-generation plants, where liquid waste products may contain radioactive elements such as uranium, or, again, at phosphoric acid manufacturing plants, where the aqueous effluents therefrom contain abundant amounts of heavy metals.

The problem of elimination of these impurities is especially crucial, since environmental protection standards are becoming increasingly strict. On the one hand, it is not permitted to discharge effluents containing certain impurities; on the other, the residues produced following purification of these effluents must not pose any danger to the environment when subsequently stored.

These effluents must, therefore, satisfy precise standards. In particular, they must not be leachable, namely, it is imperative that they not release metallic impurities contained therein during lixiviation.

SUMMARY OF THE INVENTION

Accordingly, a major object of the present invention is the provision of improved technique for removing/eliminating contaminating metallic impurities from a liquid medium, and for producing a nonleachable residue comprised of such impurities.

Briefly, the present invention features the treatment of liquid aqueous media to insolubilize metallic impurities contained therein, comprising separately introducing a phosphate source and a barium source into such liquid medium, whereby precipitating a solid residue which comprises a barium phosphate, and then separating said precipitate therefrom.

DETAILED DESCRIPTION OF BEST MODE AND PREFERRED EMBODIMENTS OF THE INVENTION

More particularly according to the present invention, the subject process is applicable for the treatment of aqueous media that may contain a large variety of metallic impurities. For example, these contaminating impurities may be alkaline earth values or heavy metals. Exemplary thereof are aluminum, barium, cadmium, chromium, nickel, lead, strontium, zinc, yttrium, scandium, and the lanthanides.

The process according to the invention is especially applicable for the treatment of liquid media containing contaminating amounts of radioactive elements such as radium, uranium, and thorium.

The process of this invention effectively removes metallic impurities from liquid media that also contain nitrate or chloride ions. An exemplary liquid medium of this type comprises the effluents emanating from a rare earth-production facility, for example, effluents resulting from the nitric acid attack of rare earth concentrates existing, in particular, as the oxides or carbonates thereof.

In accordance with the present invention, the phosphate and barium sources must be introduced separately. This means that the phosphate and the barium are not added as a single chemical compound, as would be the case if barium phosphate were added to the medium to be treated.

The phosphate source may be any source capable of introducing phosphate ions into the medium to be treated. Exemplary such sources include phosphoric acid, ammonium phosphate, or a hydrogen phosphate.

In respect of the barium source, a barium salt is preferred and, more especially, a soluble salt. Inorganic acid salts may be used, and, in particular, barium nitrate or barium chloride.

The phosphate or barium sources can be introduced at ambient temperature or at elevated temperatures.

The amount of phosphate introduced is such that it permits precipitation of a barium phosphate phase, in addition to the precipitation of the other metallic impurities. This barium phosphate phase contains throughout its mass these other metallic impurities and, thus, effectively removes same upon separation of the precipitate.

Once the phosphate and barium sources have been introduced, the pH of the medium must preferably be at least 2, in order to ensure that the maximum amount of impurities is precipitated out. More specifically, this pH may range from 1 to 10, and, preferably, from 3 to 8.

The pH may be adjusted via any known technique, such as addition of an acid or a base.

The process according to the invention can be carried out in any apparatus whatever. However, the treatment is advantageously carried out using two reaction vessels. The phosphate source is added to the first vessel, and a first suspension containing a first phosphate-based precipitate is obtained. The suspension is then circulated to a second vessel, into which the barium source is introduced.

Following the addition of the phosphate and barium sources, a precipitate is produced in the liquid medium and is separated out using any conventional method. The solid residue obtained may be dried. This residue contains a barium phosphate, which also contains metallic impurities that have been coprecipitated with the phosphate.

One significant characteristic of the residue is that it is not leachable. As regards leachability, this residue meets the American TCLP standard.

In order to further illustrate the present invention and the advantages thereof, the following specific examples are given, it being understood that same are intended only as illustrative and in nowise limitative.

EXAMPLE 1

A test aqueous solution was formulated having the following composition:
 (i) $NH_4NO_3$=180 g/l,
 (ii) Ra 228=150 Bq/l.

1.45 g of $BaCl_2.2H_2O$ and 0.45 g of $H_3PO_4$ in a proportion of 85% by weight were added to 1 liter of the test solution. The pH of this solution was adjusted to 7 using liquid ammonia. After stirring for one hour, the equivalent of 1.2 g of dry precipitate was collected. The filtered solution exhibited an Ra 228 activity of 39 Bq/l, or a purification yield of 74%.

EXAMPLE 2 (Comparative)

1.2 g of barium phosphate $Ba_3(PO_4)_2$ was added to 1 liter of the test solution prepared in Example 1. The pH of the solution was adjusted to 7 using liquid ammonia. After stirring for one hour, the filtered solution exhibited an activity level of 135 Bq/l, or a purification yield of 10%.

EXAMPLE 3

The solution treated in this example was an industrial aqueous solution, namely, an effluent resulting from the nitric acid attack of a concentrate of rare earth carbonates in a plant for the production of rare earths. In particular, the concentrate was attacked with nitric acid to provide an aqueous solution containing rare earth values and metallic impurities. The rare earth values were separated via liquid/liquid extraction to obtain an organic phase containing the rare earths and an aqueous phase containing the metallic impurities.

This aqueous phase constituted the effluent to be treated; it had the following composition:

(i) $NH_4NO_3$=180 g/l (ii) $Ca(No_3)_2$=2.3 g/l (iii) $Ce(NO_3)_3$=1 g/l (iv) $Pb(NO_3)_2$=0.6 g/l (v) Ra 228=37 Bq/l The insolubilization treatment was carried out in two successive reaction vessels while stirring.

The effluent was circulated to a first vessel, to which 85% phosphoric acid and 10N liquid ammonia were also charged, thereby adjusting the pH to 8.

The circulating product from the first vessel overflowed into a second vessel, to which a barium nitrate aqueous solution was also introduced at the rate of 3 g $Ba(NO_3)_2$ per liter of effluent.

The retention time in both vessels was 1 hour, 30 minutes.

The suspension formed in the second vessel was filtered, then analyzed. The solid residue was collected.

Table 1 below reports the precipitation yields of the various elements as a function of the residual phosphate ion concentration in the effluent.

TABLE 1

| Test No. | Effluent $PO_4$ content (g/l) | Cerium (%) | CaO (%) | BaO (%) | PbO (%) | Ra 228 (%) |
| --- | --- | --- | --- | --- | --- | --- |
| 1 | 1.2 | >99.9 | 76.9 | >99.8 | >99.8 | 93.5 |
| 2 | 1.9 | >99.9 | 89.7 | >99.8 | >99.8 | >97 |
| 3 | 3.3 | >99.9 | 96 | >99.8 | >99.8 | >97 |
| 4 | 3.8 | >99.9 | 96 | >99.8 | >99.8 | >97 |

EXAMPLE 4

The US TCLP lixiviation test (ref. 40 CFR, Ch. 1, Pt 261, App. 1) was carried out on solid residues obtained under the Test 1 conditions of Example 3. These residues were obtained from effluents having a lead content ranging from 0.1 to 4 g/l.

Table 2 below evidences that the lead content in the lixiviation products always remained below the US standard of 5 mg/l for residues containing up to the equivalent of 33% dry PbO.

TABLE 2

| PbO content of the residue (% dry) | 1.2 | 10 | 20 | 33 |
| --- | --- | --- | --- | --- |
| PbO content of the lixiviation product (mg/l) | <1 | <1 | <1 | <1 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the treatment of an impure liquid medium to insolubilize contaminating metallic impurities contained therein, comprising separately introducing a source of phosphorus and a source of barium into said impure liquid medium, wherein the source of barium is a soluble salt of barium, precipitating a solid residue which comprises a barium phosphate having said contaminating metallic impurities distributed therein, and separating said solid residue from the impure liquid medium thus purified, wherein said contaminating metallic impurities comprise at least one metal selected from the group consisting of thorium, radium and uranium.

2. The process as defined by claim 1, said contaminating metallic impurities further comprising alkaline earth metals, heavy metals, further radioactive elements, or combination thereof.

3. The process as defined by claim 1, said contaminating metallic impurities further comprising aluminum, barium, cadmium, chromium, nickel, lead, strontium, zinc, yttrium, scandium, or lanthanide values, or combination thereof.

4. The process as defined by claim 1, said impure liquid medium also comprising nitrate ions, chloride ions, or a combination thereof.

5. The process as defined by claim 1, said impure liquid medium comprising the effluent from the nitric acidulation of a rare earth concentrate.

6. The process as defined by claim 1, said source of phosphorus comprising phosphoric acid, ammonium phosphate, or a hydrogen phosphate.

7. The process as defined by claim 1, said source of barium comprising barium nitrate or barium chloride.

8. The process as defined by claim 1, said impure liquid medium comprising an industrial aqueous effluent.

9. The process as defined by claim 1, carried out serially in two reaction vessels, comprising introducing said impure liquid medium into the first of said reaction vessels and therein adding said source of phosphorus thereto, next transferring the resulting suspension which comprises a phosphate-based precipitate to said second reaction vessel and therein adding said source of barium thereto.

10. The process as defined by claim 1, the liquid medium into which said sources of phosphorus and barium have been introduced having a pH ranging from 1 to 10.

11. The process as defined by claim 10, said pH being at least 2.

12. The process as defined by claim 11, said pH ranging from 3 to 8.

* * * * *